(12) United States Patent
Verma

(10) Patent No.: US 9,476,104 B2
(45) Date of Patent: Oct. 25, 2016

(54) COLD JUICE CLARIFICATION PROCESS

(71) Applicant: Spray Engineering Devices Limited, Mohali-(Punjab) (IN)

(72) Inventor: Vivek Verma, Mohali (IN)

(73) Assignee: SPRAY ENGINEERING DEVICES LIMITED, Mohali (Punjab) (IN)

( * ) Notice: Subject to any disclaimer, the term of this patent is extended or adjusted under 35 U.S.C. 154(b) by 95 days.

(21) Appl. No.: 14/456,076

(22) Filed: Aug. 11, 2014

(65) Prior Publication Data

US 2015/0101594 A1    Apr. 16, 2015

(30) Foreign Application Priority Data

Oct. 15, 2013 (IN) .......................... 3068/DEL/2013

(51) Int. Cl.
  C13B 20/06    (2011.01)
  C13B 20/00    (2011.01)
  C13B 20/12    (2011.01)

(52) U.S. Cl.
  CPC .............. *C13B 20/06* (2013.01); *C13B 20/005* (2013.01); *C13B 20/12* (2013.01); *Y02P 40/47* (2015.11)

(58) Field of Classification Search
  None
  See application file for complete search history.

(56) References Cited

U.S. PATENT DOCUMENTS

| | | | | | |
|---|---|---|---|---|---|
| 3,994,743 | A | * | 11/1976 | Paley | C13B 20/123 127/11 |
| 4,083,732 | A | * | 4/1978 | Paley | C13B 20/165 127/10 |
| 5,006,354 | A | * | 4/1991 | Rahrooh | A23L 2/76 426/231 |
| 5,110,363 | A | * | 5/1992 | Clarke | C13B 20/005 106/217.6 |
| 6,723,367 | B2 | * | 4/2004 | Singh | A23L 2/04 127/30 |
| 2002/0011246 | A1 | * | 1/2002 | Reisig | C13B 10/00 127/54 |
| 2008/0299287 | A1 | * | 12/2008 | Carter | C13B 20/123 426/660 |
| 2013/0047980 | A1 | * | 2/2013 | Sohling | B01J 20/0248 127/46.2 |

FOREIGN PATENT DOCUMENTS

| | | |
|---|---|---|
| EP | 2 411 546 B1 | 7/2013 |
| IN | 53/MAS/2001 | 8/2004 |
| WO | 99/24623 A2 | 5/1999 |
| WO | 208/139431 A2 | 11/2008 |

OTHER PUBLICATIONS

The Effect of Liming Conditions in Juice Clarification by W.O.S. Doherty et al.*

* cited by examiner

*Primary Examiner* — Melvin C Mayes
*Assistant Examiner* — Colette Nguyen
(74) *Attorney, Agent, or Firm* — Ladas & Parry LLP

(57) ABSTRACT

A process for cold clarification of juice is described. A sugar cane or beet juice clarification process to clarify raw juice by means of deaeration of fresh raw juice, addition of milk or lime, anionic and/or cationic flocculants, particularly together with a carbonating process, addition of phosphoric acid and then passing the juice through activated carbon bed is described. The process eliminates the need to heat the juice at any stage thus making it more cost effective, energy saving and gives better yield in terms of quality and quantity both. The recycling of defecated, carbonated and phosphated filtered juice and carbonated and phosphated mud that reduces the consumption of lime, $CO_2$ and phosphoric acid up to some extent is described.

6 Claims, 1 Drawing Sheet

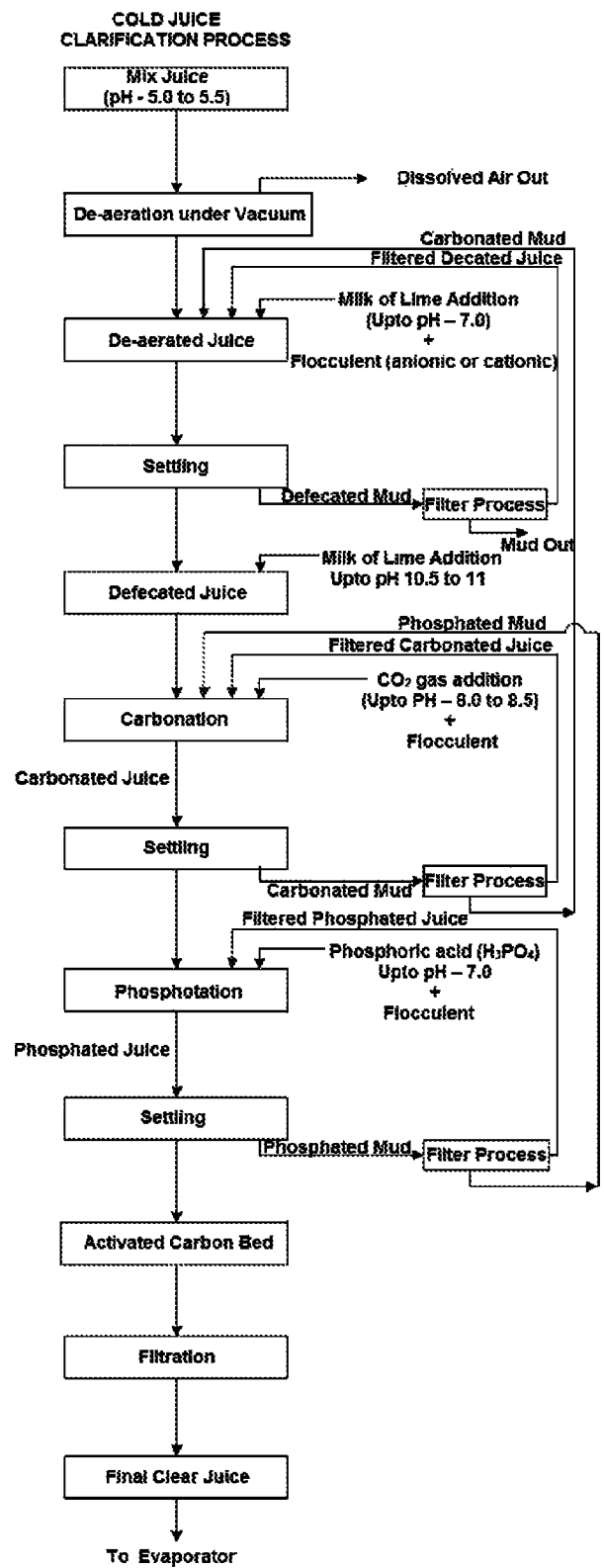

COLD JUICE CLARIFICATION PROCESS

FIELD OF INVENTION

The present invention relates to processes related to sugar industry. More specifically, this invention pertains to cold juice clarification process which is a primary step used in manufacturing sugar crystals from sugar cane or beet. This process removes color, turbidity and other impurities from the raw juice.

BACKGROUND TO THE INVENTION (PRIOR ART)

Colour of sugar is its most important commercial attribute, be it raw or white or refined. Impurities present in liquor are major source of color in the final crystalline product. Therefore, colour of sugar crystals depends on the process used to clarify the raw juices and remove impurities. Better the clarification of the sugar juice better will be the final sugar. Color levels up to 10,000 to 20,000 ICUMSA color units are often obtained after the clarification stage.

The millers and refiners spend huge resources to comply the market requirements on the colour of their product.

Sugarcane and beet juice is an extremely complex liquid containing many organic and inorganic constituents in soluble, suspended and colloidal form. Sugarcane juice has always been considered non-filterable because of the presence of highly gelatinous impurities and colored bodies in it.

Normally clarification process used for sugarcane juice has the following essential steps:
1. Sugar cane juice is limed so as the pH of the juice increases from an initial range of 5.0-6.5 to about 6.8-7.5 followed by heating.
2. After liming, chemicals are further added to juice to enhance the coagulation of the impurities. Coagulation is very important in achieving good end product.
3. Coagulation is followed by evaporation and crystallization.
4. Final clarified product is obtained in the form of high quality of the sugar crystals.

Clarification process removes impurities other than sucrose and thus minimizes loss of sucrose.
Currently used clarification methods include:
a) Cold liming b) Hot liming c) Fractional liming d) Fractional liming with double heating e) Double sulphitation f) Carbonation g) Ion exchange h) Defeco-melt process i) SAT process

SULPHITATION

In industry, sulphitation is one of the widely used processes to clarify cane juice. It consists of $SO_2$ (sulphur dioxide) absorption in the juice. But the disadvantage of this method is that $SO_2$ is considered to be hazardous for health and also causes corrosion in the equipment. Although it is used as a bleaching agent for lowering the colour of juice and syrup yet at the same time, formation of a fine precipitate of $CaSO_3$ and $CaSO_4$ also takes place which cause high and fast fouling of heating surfaces of evaporators.

CARBONATION

Another method to clarify sugarcane juice in the manufacture of crystal sugar is carbonation which generally employs treatment of juice with lime and controlled addition of carbon dioxide ($CO_2$). Carbonation method is also being used in the sugar industry for the production of sugar with lower colour. The disadvantage of this method lies in cost enhancement because Lime consumption in traditional carbonation process used in cane and beet sugar industry is approximately 1% of the cane. This increases the cost of prepared sugar that is highly undesirable. Moreover, the sugar produced by this method deteriorates very fast. Hence there is a need to adopt a better process which removed impurities and colorant materials without much use of resources.

Therefore the inventor thought of improvising the sugar cane or beet juice processing methods for achieving a better yield and better quality of final product. Many inventors are trying to achieve the same goal and patents and publications have been filed.

PRIOR ART PATENTS

U.S. Pat. No. 3,994,743 (Family patent with U.S. Pat. No. 3,808,050) entitled "Clarification and treatment of sugar juice" describes a process in which sufficient amount of aqueous alkaline slurry containing powdered active carbon is added to treat the fresh, unheated sugar cane juice.

Patent No.: EP 2411546 B1 discloses another method for producing clarified juice, packagible juice, ethanol and sugar from sugarcane but the process involves heating of juice which makes it less energy efficient.

U.S. Pat. No. 6,723,367 B2 describes a method using a membrane processing unit to clarify juice and make it in a packable form.

U.S. Pat. No. 4,083,732 describes another method for sugar juice treatment by reverse osmosis and oxalic acid.

Patent No.: U.S. 2013/0047980 A1 describes yet another method for purification of crude sugar juices by treating with acid activated bentonite which replaces the traditional environmental unfriendly sulfitation process.

Indian Patent No.: 53/MAS/2001 describes yet another method for sugar juice filtration using macro to micro filters and finally by membrane filtration using reverse osmosis process.

Patent No.: WO 1999024623 A2 describes another method for purifying the raw juice resulting from sugar refining, the said raw juice is treated with a mixture of calcium hydroxide and a clay mineral selected from the smectite and kaolin groups.

Patent No.: WO 2008139431 A2 describes another method for treating raw sugar juice by using polyamide flocculating component, sodium bentonite, activated carbon and potassium metabisulphite.

U.S. Pat. No. 5,110,363 describes another method for clarification of sugar-bearing juices, and related products by A) aluminum chloride hydroxide, B) lime and C) activated bentonite, bentonite containing calcium aluminum silicate, and preferably also a polymeric flocculating agent.

Currently used decoloration processes include:
a) Defeco Melt process b) Ion Exchange Method c) SAT Process Disadvantages of Conventional Processes:
The above processes suffer from a lot of disadvantages as follows:
1. The treatment of sugar juices by heat is always a precarious procedure due to the fact that inversion takes place much more readily at elevated temperatures. Moreover, if this heat energy is saved, it can be efficiently utilized elsewhere.
2. The method utilizing sulphur dioxide absorption in the juice is considered to be hazardous for health and causes corrosion due to higher fouling rates of heating surfaces in evaporators and imparts cleaning cost.
3. Scaling in evaporators causes ineffective heat transfer and consequently low Brix of syrup which further affects the pan boiling time adversely.
4. The chemical cost due to higher chemical consumption and equipment required for defecation often represents a substantial part in the total cost of the final product. With the conventional purification techniques with liming and carbonation, there is need for installation of lime furnaces and turbo compressors for $CO_2$.
5. The conventional methods require repeated filtration and heating and consequent loss of heat energy, sugar yield and also waste of time and labour.
6. The purity reached by these defecation processes is generally not more than 92%. And this purity level is not acceptable in the sugar industry.

A need was felt by the inventor of the present invention to provides a unique yet simple method to clarify the sugar cane or beet juice which obviates the drawbacks of the prior art, is more energy efficient, gives better yield of sugar in terms of quality and quantity both.

OBJECTS OF THE INVENTION

The principal object of the invention is to disclose a process to clarify sugar cane or beet juice in order to remove colour, turbidity and other impurities in an energy efficient manner i.e. without heating at any stage.

Another object of the invention is to facilitate the settling of mud flocs in clarifier without using conventional methods of using chemicals.

Another object of the invention is to recycle the filtered defecated juice into de-aerated juice, filtered carbonated juice into carbonation process and filtered phosphated juice into the phosphotation process.

Yet another object of the invention is to re-use the carbonated mud into de-aerated juice and phosphated mud into carbonated juice.

Yet another object of the invention is to make the process sulphur-free so as to prevent the higher fouling of heating surface in evaporators.

Yet another object of invention is to prevent sugar inversion losses for improvement of sugar yield.

One more object of the present invention is to disclose a process of clarifying sugar cane or beet juice which enhances pan boiling capacity.

Still another object of the invention is to reduce the final cost of sugar production by using innovative technique.

SUMMARY OF THE INVENTION

The invention discloses a sugar cane or beet juice clarification process comprising the steps of addition of milk of lime; flocculents, carbon dioxide, phosphoric acid and then passing the juice through activated carbon bed. This juice clarification process does not require heating at any stage and thus, it is an energy efficient process which prevents inversion losses, improves yields and reduces colour and turbidity.

More specifically, the invention for improved juice clarification process without heating comprising the following steps:
a) De-aeration of raw sugarcane or beet juice;
b) Adding of milk of lime;
c) Addition of flocculents followed by mud separation;
d) Again addition of milk of lime;
e) Carbonation followed by mud separation;
f) Addition of phosphoric acid followed by mud separation and
g) Treatment of the juice through activated carbon bed.

BRIEF DESCRIPTION OF THE DRAWING

FIG. 1 shows complete process flow diagram of the cold juice clarification process using the present invention.

DETAILED DESCRIPTION OF THE INVENTION WITH REFERENCE TO THE DRAWING

For further references with FIG. 1 in the following description, fresh raw juice implies the juice of sugar cane or beet. The invention comprises a sugar cane or beet juice clarification process comprising of addition of milk of lime, addition of flocculents, followed by carbonation, phosphatation and then treating the juice through activated carbon bed. The pH of the fresh raw juice is measured using pH meter. The process typically comprises of various steps that include deaeration of fresh raw juice, addition of $CO_2$ gas, addition of phosphoric acid and treatment of the juice through activated carbon bed.

Normally entrapped micro bubbles in the air resist the settling of mud flocs. These entrapped bubbles are of so small size that the buoyant forces on them are countered by the drag forces and air bubbles keep suspended in the juice creating hindrance for the flocs to settle. The de-aeration is of extreme importance since it causes the removal of entrapped air and thus fast settling of flocs by gravity. The air has been removed from the juice by application of vacuum.

Therefore at first stage, fresh raw juice at milling temperature is deaerated through vacuum. Milk of Lime (MOL) is then added till the pH of juice rises to 7.0. Addition of lime and thereby increase in the pH, causes precipitation of calcium and phosphate ions and denaturing of the proteins, gums, waxes, pectin and other inorganic compounds present in the juice.

The cold clarification process further involves the addition of ionic and cationic flocculents. Flocculents being charges ions attract the oppositely charged precipitate surfaces and thus help to coagulate them into flocs. In the absence of the entrapped air these flocs settles very fast that within 15-20 minutes upper column remained as clear transparent liquid and bottom of the clarifier filled with mud. The defecated muddy juice is passed through the filter press and filtered defecated juice recycled again in the de-aerated juice. The collected mud from filter press of defecated muddy juice is sent out for other uses.

The cold clarification further involves the addition of Milk of Lime again to clear liquid received after the above steps so as to raise its pH to 10.5-11. This limed juice is further treated by bubbling with carbon dioxide gas so as neutralize the juice. Carbon dioxide is bubbled from the bottom to reacts with the lime present in the juice to form fine crystals of calcium carbonate. These fine crystals got suspend throughout the juice while $CO_2$ bubbling and help in the precipitation of the further dissolved impurities. Further, addition of flocculent to the liquid helps coagulation of calcium carbonate and dissolved impurities. Because of the higher molecular weight of the calcium carbonate and associated impurities, the mass settles as carbonated mud and more clear liquor remained thereafter. The carbonated muddy juice is filtered with filter press and filtered carbonated juice is recycled in carbonation process chamber. The collected carbonated mud after filter press is re-used in de-aerated juice. This carbonated mud can also be removed out.

Next step in cold clarification is the treatment of the received juice with phosphoric acid. The pH is maintained to be 7.0. Addition of phosphoric acid helps to precipitates remained colloidal and coloring material which further coagulated by the addition of floceulent. The mass so formed settle at the bottom of the clarifier as Phosphoric Mud. The phosphated muddy juice is sent to the filter press and filtered phosphated juice is recycled in the phosphotation process chamber. The collected phosphated mud after filter press is re-used in the carbonation process chamber. This phosphated mud can also be removed out.

The advantage of recycling the carbonated and phosphated muddy juice is that it contains very less of mud and lots of carbon and phosphate. This carbon and phosphate is re-utilized and thus the overall process cost decreases drastically. Final step involves the treating the received phosphate juice by activated carbon. Activated carbon has the affinity for the dissolved organics in the juice. Juice while passing through the activated carbon bed leaves most the dissolved organics which got adsorbed on the carbon surface. Juice gets devoid of further any coloring material and impurities. This process restricts the growth of micro-organism. The biocide can also be used at mills for killing of the bacterial growth. The juice from activated carbon bed is again filtered with filter and finally the clear juice is received.

EXAMPLE 1

An experiment has been performed at Lab Scale as under:

According to FIG. 1, the fresh raw juice of brix 9 to 22% with temperature 18 to 27° C. and pH 5.2 to 6.0 is deaerated under vacuum using a vacuum pump. After the air is removed out of the juice, milk of lime is added (defecation) till the pH of juice rises to 7.0. Pol % of the deaerated juice is also measured using polarimeter. The purity of juice is determined by relating the values of Pol % and brix %.

Then 0.1% anionic and/or cationic flocculent is added in the juice, stirred and then kept for 15 to 20 minutes to settle down. The added flocculent leads to the settling of mud whereas the clear juice (supernatant) is separated in a separate clarifier, leaving settled muddy juice at the bottom. The settled defecated muddy juice filtered through the filter press and filtered defecated juice is recycled into the de-aerated juice and defecated mud sent out for other uses. Thereafter, milk of lime of 6 Be$^0$ is added to the clear juice again till the pH of the juice becomes 10.5-11.0. Further, $CO_2$ gas is passed though (Carbonation) into the juice till its pH reaches 8.0-8.5. Again 0.1% anionic and/or cationic flocculent is added into the juice and kept for 15-20 minutes to separate the clear juice (supernatant) and carbonated muddy juice which settles down. The carbonated muddy juice filtered through the filter press and filtered carbonated juice recycled into carbonation process and carbonated mud after filter press re-use into the defecated juice. This carbonated mud can also be removed out.

The separated juice is added with 5% of phosphoric acid till pH becomes 7.0 and then again, 0.1% anionic and/or cationic flocculent is added and kept for 15 to 20 minutes to settle down that leads to the formation of large flocs which settle down quickly. The clear juice is again separated in the clarifier leaving large flocs at the bottom and the clear juice is passed through activated carbon bed. The juice added with activated carbon bed is collected and this juice is observed to have less color value with purity rise of 0.50 to 3.00 units. This clear juice can be directly taken for evaporation. The phosphated muddy juice filtered through the filter press and filtered phosphated juice recycled into phosphotation process and phosphated mud after filter press re-use into the carbonated juice. This phosphated mud can also be removed out. The recycling of carbonated and phosphated filtered juice and mud reduces the consumption of lime, $CO_2$ and phosphoric acid up to some extent.

Chemical consumption during this process as under:

| | |
|---|---|
| Lime | 0.25 to 0.30% on cane |
| Phosphoric Acid | 0.03 to 0.032% on cane |
| Flocculent | 0.00285% on cane |

This novel process of the invention for the clarification of cane juice that does not involve any heating process has the following significant advantages over the existing knowledge:

1. Sulphur free;
2. Minimum color occlusion;
3. Lower inversion loss;
4. Energy saving;
5. Red action in the cost of sugar production;
6. Reduce scale formation in evaporator due to maximum removal of non-sugars;
7. Increased Pan Boiling capacity.

The above description with reference to the drawing and example is illustrative in nature and should not be limiting to the above. Any variation to the implementation of the said cold juice processing method without deviation from the spirit of the present invention, by a person skilled in art, should be considered within the scope of the present invention.

I claim:

1. A cold juice clarification process used for sugar cane or beet juice, wherein the process comprises the steps of:
   (i) de-aerating raw sugar cane or beet juice under vacuum;
   (ii) adding milk of lime in the juice from step (i) until the pH of the juice increases to about 7.0;
   (iii) adding flocculants in the juice from step (ii);
   (iv) settling and separating mud from the juice of step (iii);
   (v) adding milk of lime in the juice from step (iv) until the pH of the juice increases to about 10.5-11;
   (vi) adding $CO_2$ in the juice from step (v) until the pH of the juice decreases to about 8.0-8.5;
   (vii) adding flocculants in the juice from step (vi);
   (viii) settling and separating carbonated mud from the juice of step (vii);
   (ix) adding phosphoric acid in the juice from step (viii) until the pH of the juice decreases to about 7.0;
   (x) adding flocculants in the juice of step (ix);
   (xi) settling and separating phosphated mud from the juice of step (x):
   (xii) passing the juice of step (xi) through an activated carbon bed: and
   (xiii) optionally filtering the juice of step (xii).

2. The cold juice clarification process of claim 1, wherein the juice of step (iv) is passed through a filter press and recycled to a de-aerated juice chamber.

3. The cold juice clarification process of claim 1, wherein the juice of step (viii) is recycled to a carbonation process chamber.

4. The cold juice clarification process of claim 1, wherein the juice of step (xi) is recycled to a phosphotation process chamber.

5. The cold juice clarification process of claim 1, wherein the carbonated mud from the juice of step (viii) is re-used in a de-aeration juice chamber.

6. The cold juice clarification process of claim 1, wherein the phosphated mud from the juice of step (xi) is re-used in a carbonation process chamber.

\* \* \* \* \*